(12) United States Patent
Francini et al.

(10) Patent No.: US 7,123,262 B2
(45) Date of Patent: Oct. 17, 2006

(54) METHOD OF ANIMATING A SYNTHESIZED MODEL OF A HUMAN FACE DRIVEN BY AN ACOUSTIC SIGNAL

(75) Inventors: Gianluca Francini, Turin (IT); Claudio Lande, Turin (IT); Skjalg Lepsoy, Turin (IT); Mauro Quaglia, Turin (IT)

(73) Assignee: Telecom Italia Lab S.p.A., Turin (IT)

( * ) Notice: Subject to any disclaimer, the term of this patent is extended or adjusted under 35 U.S.C. 154(b) by 505 days.

(21) Appl. No.: 09/980,373

(22) PCT Filed: Mar. 9, 2001

(86) PCT No.: PCT/IT01/00117

§ 371 (c)(1),
(2), (4) Date: Nov. 29, 2001

(87) PCT Pub. No.: WO01/75805

PCT Pub. Date: Oct. 11, 2001

(65) Prior Publication Data

US 2006/0012601 A1    Jan. 19, 2006

(30) Foreign Application Priority Data

Mar. 31, 2000 (IT) .......................... TO2000A0303

(51) Int. Cl.
*G06T 15/00* (2006.01)
(52) U.S. Cl. .................................................... 345/473
(58) Field of Classification Search ................. 345/473
See application file for complete search history.

(56) References Cited

U.S. PATENT DOCUMENTS

| 5,608,839 | A | * | 3/1997 | Chen ........................... 704/235 |
| 6,097,381 | A | * | 8/2000 | Scott et al. ............... 715/500.1 |
| 6,208,356 | B1 | * | 3/2001 | Breen et al. ................ 345/473 |
| 6,366,885 | B1 | * | 4/2002 | Basu et al. ................. 704/270 |
| 2002/0116197 | A1 | * | 8/2002 | Erten .......................... 704/273 |

FOREIGN PATENT DOCUMENTS

| EP | 0 710 929 | 5/1996 |
| WO | WO-97/46974 | 12/1997 |

OTHER PUBLICATIONS

Facial Expression Synthesis Based on Nautural Voice . . . by Morishima et al. (0-7803-1363-1/93 1993 IEEE.

* cited by examiner

*Primary Examiner*—Mark Zimmerman
*Assistant Examiner*—Peter-Anthony Pappas
(74) *Attorney, Agent, or Firm*—Herbert Dubno (57) ABSTRACT

The method permits the animation of a synthesised model of a human face in relation to an audio signal. The method is not language dependent and provides a very natural animated synthetic model, being based on the simultaneous analysis of voice and facial movements, tracked on real speakers, and on the extraction of suitable visemes.

The subsequent animation consists in transforming the sequence of visemes corresponding to the phonemes of the driving text into the sequence of movements applied to the model of the human face.

9 Claims, 6 Drawing Sheets
(2 of 6 Drawing Sheet(s) Filed in Color)

METHOD OF ANIMATING A SYNTHESIZED MODEL OF A HUMAN FACE DRIVEN BY AN ACOUSTIC SIGNAL

TECHNICAL FIELD

This invention relates to audio-visual or multimedia communication systems, and more particularly, to a method of animating a synthesized model of a human face driven by an audio signal.

BACKGROUND ART

Interest surrounding the integration of natural or synthetic objects in the development of multimedia applications to facilitate and increase user-application interaction is growing, and in this context the use of anthropomorphic models, destined to facilitate man-machine relationship, is being envisaged. This interest has been recently acknowledged also by international standardization organizations. ISO/IEC standard 14496 "Generic Coding of Audio-Visual Objects" (commonly known as the "MPEG-4 standard" and hereinafter referred to as such), among other things, aims at establishing a general framework for such applications.

In such applications in general, regardless of the specific solutions indicated in the MPEG-4 standard, anthropomorphic models are conceived to assist other information flows and are seen as objects which can be animated, where animation is driven by audio signals, as, for example, speech. These signals can also be considered as phonetic sequences, i.e. as sequences of "phonemes", where a "phoneme" is the smallest linguistic unit (corresponding to the idea of a distinctive sound in a language).

In this case, animation systems able to deform the geometry and the appearance of the models synchronized to the voice itself need to be developed for the synthetic faces to assume the typical expressions of speech. The final result to which development tends is a talking head, or face, which appears natural to the greatest possible extent.

The application contexts of animated models of this kind can range from Internet applications, such as welcome or help-on-line messages, to co-operative work applications (e.g. e-mail browsers), to professional applications, such as the creation of cinema or television post-production effects, to video games, etc.

The models of human faces commonly used are, in general, made on the basis of a geometrical representation consisting of a three-dimensional mesh structure (known as a "wire-frame"). Animation is based on the application, in succession, of suitable transforms to the polygons forming the wire-frame (or a respective sub-set) to reproduce the required effect, i.e. in this specific case, the reproduction of movements related to speech.

The solution envisaged by the MPEG-4 standard for this purpose describes the use of a set of facial animation parameters, defined independently with respect to the model, to ensure interoperability of systems.

This set of parameters is organized on different levels: the highest level consists of the so-called "visemes" and "expressions", while the lowest level consists of the elementary transforms permitting generic posture of the face. According to MPEG-4 standard, a viseme is the visual equivalent of one or more similar phonemes.

In this invention, the term viseme is used to indicate a shape of the face, associated with the utterance of a phoneme and obtained by means of the application of low-level MPEG-4 parameters, and does not therefore refer to high-level MPEG-4 parameters.

Various systems for animating facial models driven by voice are known in literature. For example, the following documents can be quoted: "Converting Speech into Lip Movements: A Multimedia Telephone for Hard of Hearing People", by F. Lavagetto, IEEE Transactions of Rehabilitation Engineering, Vol. 3, N. 1, March 1995; DIST, Genoa University "Description of Algorithms for Speech-to-Facial Movements Transformation", ACTS "SPLIT" Project, November 1995; TUB, Technical University of Berlin, "Analysis and Synthesis of Visual Speech Movements, ACTS "SPLIT" Project, November 1995. These systems, however, do not implement MPEG-4 standard compliant parameters and, for this reason, are not very flexible.

An MPEG-4 compliant standard animation method is described in Italian Patent Application no. TO98A000842 by the Applicant. This method associates visemes selected from a set, comprising the visemes defined by the MPEG-4 standard and visemes specific to a particular language, to phonemes or groups of phonemes. According to this method, visemes are split into a group of macro parameters, characterizing shape and/or position of the labial area and of the jaw of the model, and are associated to respective intensity values, representing the deviation from a neutral position and ensuring adequate naturalness of the animated model.

Furthermore, the macro parameters are split into the low-level facial animation parameters defined in the MPEG-4 standard, to which intensity values linked to the macro parameter values are associated also, ensuring adequate naturalness of the animated model.

Said method can be used for different languages and ensures adequate naturalness of the resulting synthetic model. However, the method is not based on motion data analysis tracked on the face of a real speaker. For this reason, the animation result is not very realistic or natural.

DISCLOSURE OF THE INVENTION

The method according to this invention is not language dependent and makes the animated synthetic model more natural, thanks to the fact that it is based on a simultaneous analysis of the voice and of the movements of the face, tracked on real speakers.

The method of animating a synthesized model of a human face driven by an audio signal, according to the invention comprises an analytic phase, in which an alphabet of low level visemes is determined, and a synthesis phase, in which the audio driving signal is converted into a sequence of low level visemes applied to a model, wherein said analytic phase comprises the steps of extracting both a set of information representing the shape of a speaker face and corresponding sequences of phonetic units from a set of audio training signals;

compressing said set of information into active shape model (ASM) parameter vectors;

associating to said active shape model (ASM) parameter vectors representative of phonetic units an interpolation function to provide a continuous representation of movement between phonemes, wherein said interpolation function is a convex combination having combination coefficients variable as a continuous function of time whereby said association determines said alphabet of low level visemes;

associating low level parameters of facial animation, compliant with Standard ISO/IEC 14496 VER. 1, to said low level visemes;

wherein said synthesis phase comprises the steps of
extracting a sequence of phonetic units of an audio driving signal;
associating to said sequence of phonetic units a corresponding sequence of low level visemes as determined in the analytic phase;
transforming said sequence of low level visemes through an interpolation function to provide a continuous representation of movement between phonemes, wherein said interpolation function is a convex combination having combination coefficients variable as a continuous function of time; and
wherein the combination coefficients carried out in the synthesis phase are the same as those used in the analytic phase.

2. The combination coefficients $B_n$ (t) of the convex combinations can be functions of the following type:

$$\beta_n(t) = \begin{cases} \cos^2\left(\frac{\pi}{2}\frac{t-t_n}{t_{n+1}-t_n}\right); & t \in [t_n, t_{n+1}] \\ \cos^2\left(\frac{\pi}{2}\frac{t-t_n}{t_n-t_{n-1}}\right); & t \in [t_{n-1}, t_n] \\ 0; & t \notin [t_{n-1}, t_{n+1}] \end{cases}$$

where $t_n$ is the instant of utterance of the nth phonetic units.

The wire-frame vertices, corresponding to the model feature points, on the basis of which facial animation parameters are determined in the analytic phase, can be identified and the low-level viseme interpolation operations are conducted by applying transforms on feature points for each low-level viseme, for animating a wire-frame based model.

For each position to be assumed by the model in the synthesis phase, the transforms can be applied only to the vertices of the wire-frame corresponding to the feature points and the transforms are extended to the remaining vertices by means of a convex combination of the transforms applied to the vertices of the wire-frame corresponding to the feature points.

The low-level visemes can be converted into co-ordinates of the feature points of the face of the speaker, followed by conversion of said co-ordinates into said low-level facial animation parameters compliant with Standard ISO/IEC 14496 VER.1.

The low-level facial animation parameters, representing the co-ordinates of feature points, can be obtained in the analytic phase by analyzing the movements of a set of markers (7) which identify the feature points themselves.

The data representing the co-ordinates of the feature points of the face are normalized according to the following method:

a sub-set of markers are associated to a stiff object (8) applied to the forehead of the speaker;

the face of the speaker is set, at the beginning of the recording, to assume a position corresponding as far as possible to the position of a neutral face model, as defined in standard ISO/IEC 14496 Rev. 1, and a first frame of the face in such neutral position is obtained;

for all frames subsequent to the first frame, the sets of co-ordinates are rotated and translated so that the co-ordinates corresponding to the markers of said sub-set coincide with the co-ordinates of the markers of the same sub-set in the first frame.

The invention also is a method of generating an alphabet of low level visemes for animating a synthesized model of a human face driven by an audio signal, comprising the steps of extracting both a set of information representing the shape of a speaker face and corresponding sequences of phonetic units from a set of audio training signals;
compressing said set of information into active shape model (ASM) parameter vectors;
associating to said active shape model (ASM) parameter vectors representative of phonetic units an interpolation function to provide a continuous representation of movement between phonemes, wherein said interpolation function is a convex combination having combination coefficients variable as a continuous function of time whereby said association determines said alphabet of low level visemes.

The combination coefficients $B_n$ (t) of the convex combinations can be functions of the following type:

$$\beta_n(t) = \begin{cases} \cos^2\left(\frac{\pi}{2}\frac{t-t_n}{t_{n+1}-t_n}\right); & t \in [t_n, t_{n+1}] \\ \cos^2\left(\frac{\pi}{2}\frac{t-t_n}{t_n-t_{n-1}}\right); & t \in [t_{n-1}, t_n] \\ 0; & t \notin [t_{n-1}, t_{n+1}] \end{cases}$$

where $t_n$ is the instant of utterance of the nth phonetic units.

The use of the so-called "Active Shape Models" (Active Shape Models or ASM, acronym which will be used hereinafter) is suggested to animate a facial model guided by voice in the documents "Conversion of articulatory parameters into active shape model coefficients for lip motion representation and synthesis", S. Lepsøy and S. Curinga, Image Communication 13 (1998), pages 209–225, and "Active shape models for lip motion synthesis", S. Lepsøy, Proceedings of the International Workshop on Synthetic-Natural Hybrid Coding and Three Dimensional Imaging (IWSNHC3DI 97), Rhodes (Greece), September 1997, pages 200–203, which specifically deal with the problem of motion representation conversion. The active shape model method is a representation technique for distributing points in space, which is particularly useful for describing faces and other transformable objects by means of a few parameters. These active shape models, consequently, permit data quantity reduction. This is the property which will be exploited for the purpose of this invention.

Further details on active shape model theory can be found, for example, in the document by T. F. Cootes, D. Cooper, C. J. Taylor and J. Graham, "Active Shape Models—Their Training and Application, Computer Vision and Image Understanding", Vol. 61, no. 1, January 1995, pages 38–59.

BRIEF DESCRIPTION OF DRAWINGS

The file of this patent contains at least one drawing executed in color. Copies of this patent with color drawings will be provided by the Patent and Trademark Office upon request and payment of the necessary fee. Reference is made to the following drawings for further clarification.

Reference is made to the following drawings for further clarification, wherein.

BEST MODE FOR CARRYING OUT THE INVENTION

The following generic premises must be made before describing the invention in detail.

Animation is driven by phonetic sequences in which the instant of time when each phoneme is uttered is known. This invention describes an animation method which is not language dependent: this means that the sequence of operations to be followed is the same for each language for which movement of speech is to be reproduced. This invention permits the association of the respective movements of the human face to the phonetic data which is specific to a language. Such movements are obtained by means of statistic analysis, providing very realistic animation effects. In practice, given the case of a model obtained on the basis of a wire-frame, animation consists in applying a set of movements, created as movements relative to a basic model, representing an inexpressive or neutral face, as defined in the MPEG-4 standard, to the vertices of the wire-frame. These relative movements are the result of a linear combination of certain basic vectors, called auto-transforms. One part of the analysis, described below, will be used to find a set of such vectors. Another part will be used to associate a transform, expressed in terms of low-level animation parameters—the so-called FAPs (Facial Animation Parameters), defined in the MPEG-4 standard—to each phoneme.

The animation, or synthesis, phase will then consist in transforming the sequence of visemes, corresponding to the phonemes in the specific driving text, into the sequence of movements for the vertices of the wire-frame on which the model is based.

Figure 1:
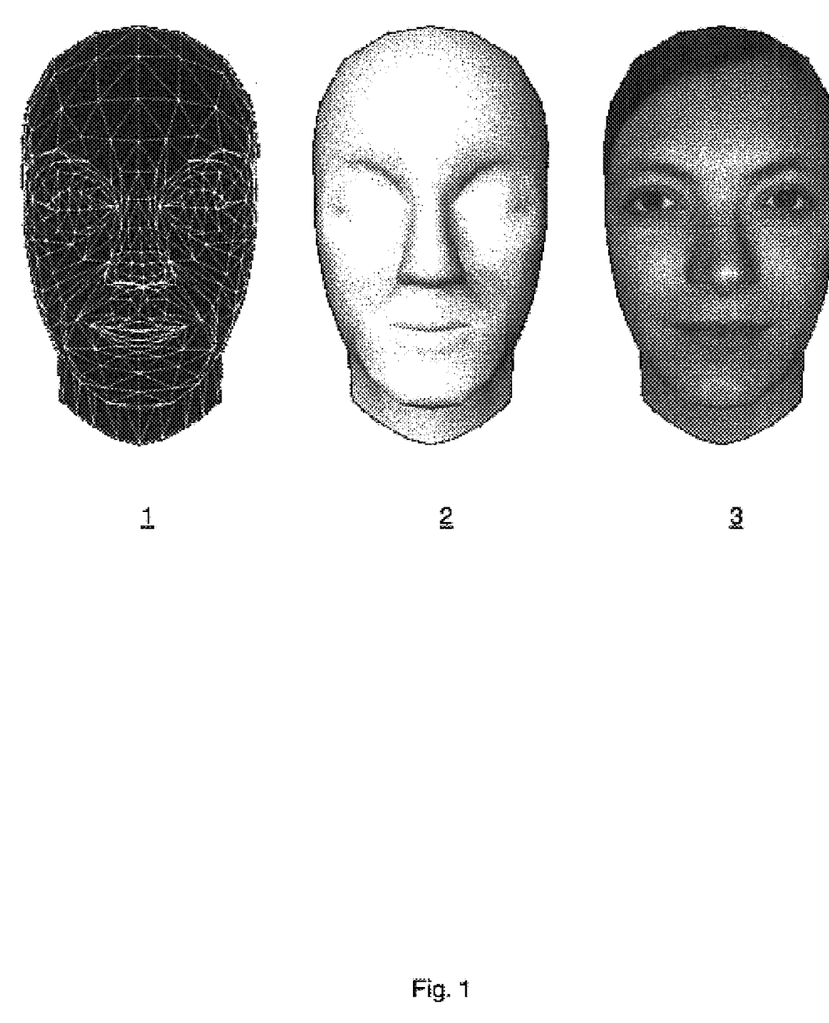
FIG. 1 shows three pictures of a human face model: a wire-frame only picture on the left; a picture with homogenous coloring and shading in the middle; a picture with added texturing on the right.

A human face model, created on the basis of a wire-frame structure, is shown in FIG. 1 to facilitate the comprehension of the following description. Number 1 indicates the wire-frame structure, number 2 is associated to the texture (i.e. to a surface which fills the wire-frame crossing the vertices of the wire-frame itself) and number 3 indicates the model completed with the picture of a real person. The creation method of a model on the basis of the wire-frame is not part of this invention and will not be further described herein. An example of the process related to this creation is described by the Applicant in Italian patent application no. TO 98A000828.

Figure 2:
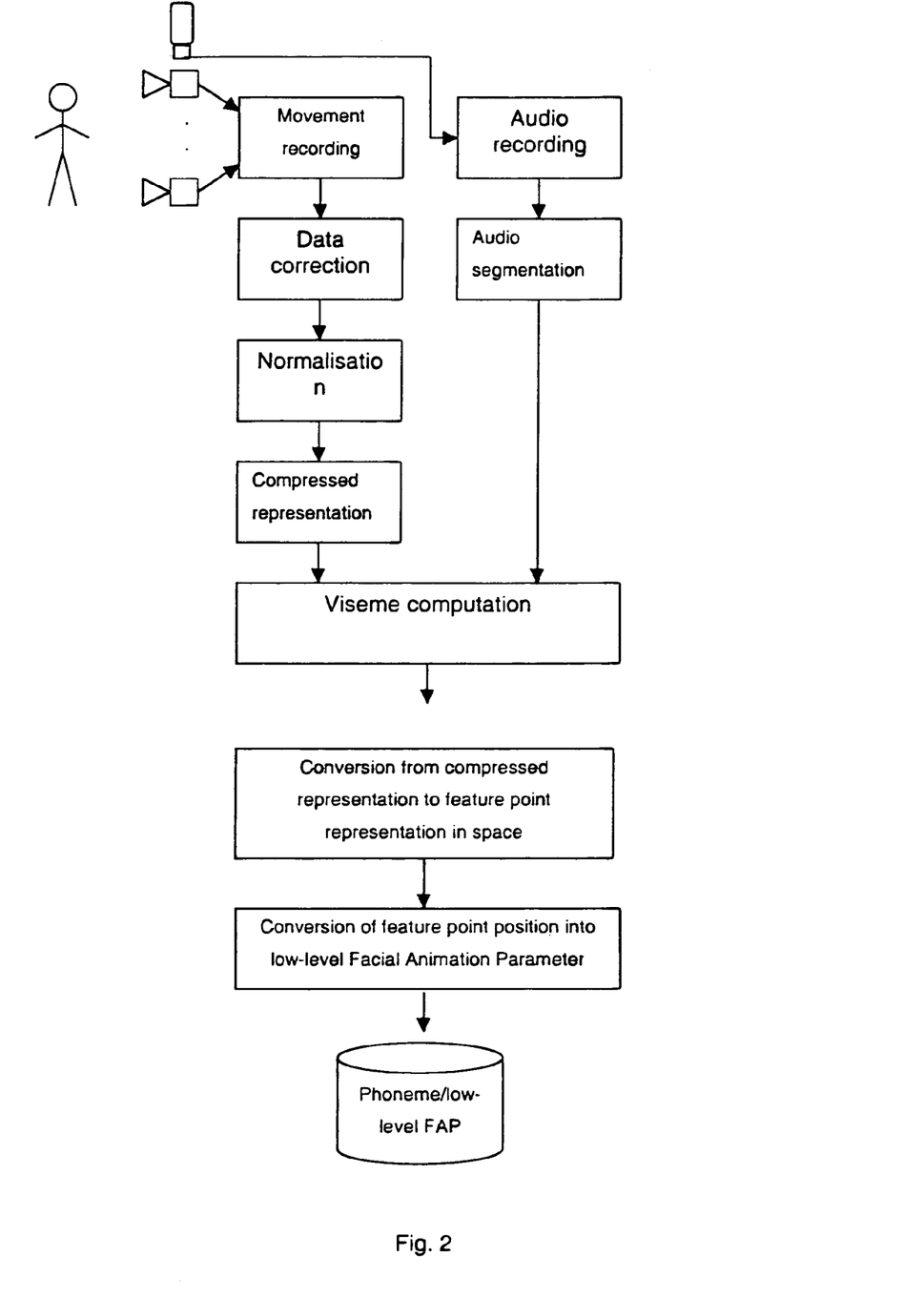
FIG. 2 is a flow chart illustrating the analytic operations associating the language-specific phonetic data and the respective movements of the human face.

FIG. 2 illustrates the analytic phase related to the process according to this invention in greater detail.

A speaker 4 utters, in one or more sessions, the phrases of a set of training phrases and, while the person speaks, both the voice and the facial movements are recorded by means of suitable sound recording devices 5 and television cameras 6. At the same time, a phonetic transcription of the uttered texts is made to obtain the phonemes present in the text.

The voice recording devices can be analogue or digital devices providing an adequate quality to permit subsequent phonetic alignment, i.e. to permit the identification of the instants of time in which the various phonemes are uttered.

This means that the temporal axis is split into intervals, so that each interval corresponds to the utterance of a certain phoneme ("Audio segmentation" step in FIG. 2). An instant is associated to each interval, instant in which the phoneme is subjected to the minimal influence of the adjacent phonemes. Hereinafter, the instant described above will be understood when reference is made to a temporal instant linked to a phoneme.

Figure 3:
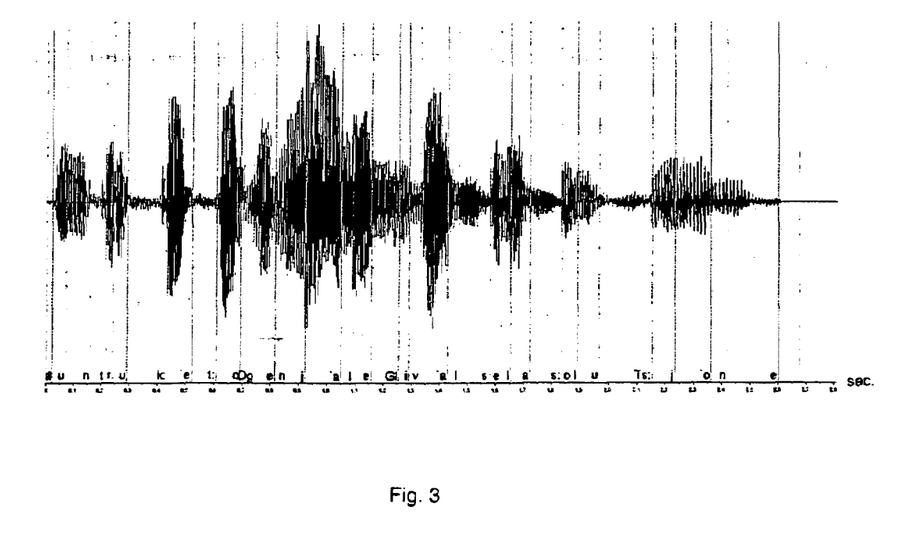
FIG. 3 shows as example of phonetic alignment.

Reference can be made to FIG. 3 and to Table 1 below, both pertaining to the phonetic analysis and phonetic transcription, with respective timing, of the phrase "Un trucchetto geniale gli valse l'assoluzione" to clarify the concept of phonetic alignment.

TABLE 1

| # | 0.014000 |
|---|---|
| u | 0.077938 |
| n | 0.166250 |
| t | 0.216313 |
| r | 0.246125 |
| u | 0.296250 |
| k: | 0.431375 |
| 'e | 0.521872 |
| t: | 0.619250 |
| o | 0.695438 |
| Dg | 0.749188 |
| e | 0.811375 |
| n | 0.858938 |
| j | 0.920625 |
| 'a | 1.054101 |
| l | 1.095313 |
| e | 1.153359 |
| Gl | 1.254000 |
| I | 1.288125 |
| v | 1.339656 |
| 'a | 1.430313 |
| l | 1.464000 |
| s | 1.582188 |
| e | 1.615688 |
| l | 1.654813 |
| a | 1.712982 |
| s: | 1.840000 |
| o | 1.873063 |
| l | 1.899938 |
| u | 1.966375 |
| Ts: | 2.155938 |
| j | 2.239875 |
| 'o | 2.364250 |
| n | 2.416875 |
| e | 2.606188 |
| @ | 2.617500 |

Voice and movement are recorded in a synchronized fashion. Consequently, phonetic alignment provides the information on which phoneme was uttered in each frame. This information permits estimation of the geometric equivalent of the face for each phoneme of the alphabet.

Again with reference to FIG. 2 and considering the recording of facial movements, this recording is advantageously obtained by means of the "motion tracking" technique, which permits very plausible animation based on examination of movements of a set of markers located at significant facial features, e.g. the corners of the eyes, the edge of the lips and the face. These markers are indicated with number 7 in FIG. 4. The points selected for the markers will be called "landmarks" or "feature points". The markers are generally small objects, the special position of which can be detected by means of optical or magnetic devices.

Figure 4:
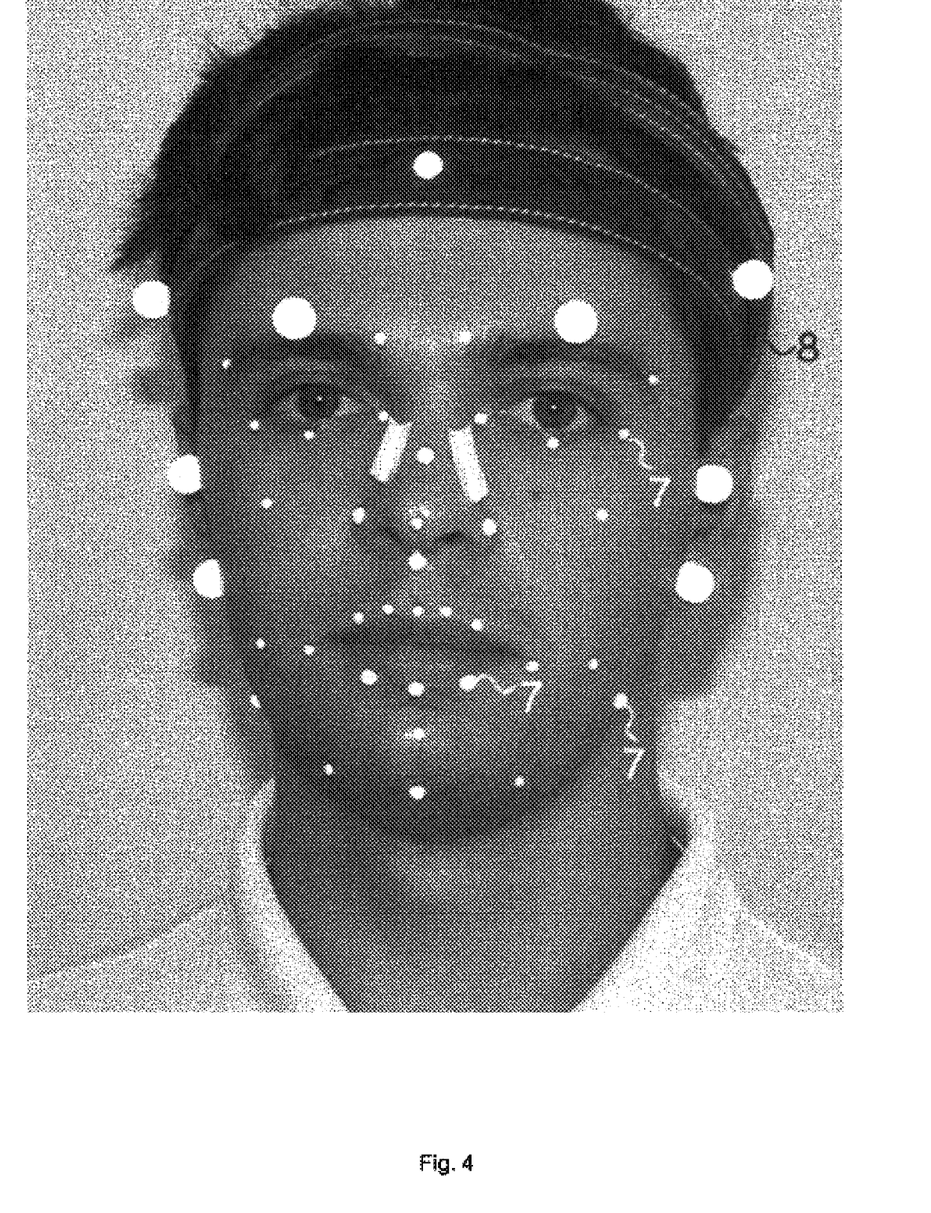
FIG. 4 illustrates the set of markers used during a generic motion tracking session.

The motion tracking technique is well known in the sector and does not require further explanation herein. A certain number of phrases, at least one hundred, need to be recorded for each language, to obtain a significant set of data. Consequently, due to the limitations of motion tracking device internal storage capacity and errors in phrase reading, the recording should preferably be carried out in several sessions, each of which will be dedicated to one or more phrases.

The data obtained by tracking the motion of markers 7 consist of a set of co-ordinates which are not suitable for direct analysis for several reasons. This is because differences in the position of the subject will result if several shooting sessions are carried out. Furthermore, the inevitable head movements must be deleted from the data. The objective is to model the movements related to a neutral posture of the face and not the absolute movements. Aspects will also depend on the devices employed. Errors in recorded data may occur, such as sudden movements and disappearance of some markers for a certain time. These errors require a correction phase in order to obtain reliable data. In other words, correction and normalisation of raw data is required.

For this purpose, at the beginning of each recording, the speaker's face must assume, as far as possible, the neutral position of the face defined in the MPEG-4 standard. Normalization (or training data cleaning) consists in aligning a set of points, corresponding to markers 7, with the respective feature points in a generic model of a neutral face. Spatial orientation, position and dimension of this facial model are known. The parameters of this transformation are computed on the basis of the first frame in the recording. The reference to a frame in the sequence is required because the markers 7 may not be in the same position in different recordings. This operation is carried out for each recorded sequence.

In practice, a certain number of markers, e.g. three, used for the recording lie on a stiff object which is applied to the forehead (the object indicated with number 8 in FIG. 4) and are used to nullify the inevitable movements of the subject's entire head during recording. As an example, for the sake of simplicity, we can suppose that the first three markers are used. Consequently, the sets of co-ordinates are rotated and translated for all frames subsequent to the first in a sequence, so that the first three markers coincide with the corresponding markers in the first frame.

After this operation, the first three markers are no longer used. Furthermore, the positions of the feature points on the real face of each picture will need to coincide to the greatest possible extent with the positions of the model chosen as the neutral face, and this entails scaling the recorded picture to adapt it to the dimensions of the model, and translating it. As mentioned, the first three markers are no longer used for this phase.

In order to handle a larger quantity of movement data (and, for some embodiments, also to reduce the quantity of data to be transmitted), a compressed representation of the movements must be found. This compression exploits the fact that movement in various areas of the face is correlated: consequently, according to this invention, the numeric representation of the movements is compressed and expressed, as mentioned above, as combinations of a few basic vectors, called auto-transforms. The auto-transforms must allow the closest possible approximation of facial movements contained in the recorded and transformed sequence. It is emphasised that the movements herein treated relate to a neutral posture. The objective of compression is reached by means of principle component analysis (PCA), a constituent part of ASM. The main components resulting from this analysis are identical to auto-transforms and have the same meaning in the invention.

The posture of the face (i.e. the positions of feature points) assumed during speech, can be approximated with a certain accuracy as a linear combination of auto-transforms. These linear combinations offer a representation of visemes being expressed as positions of feature points (by means of lower level parameters). The coefficients of the linear combination are called ASM parameters. Summarizing, a vector x, containing the co-ordinates of feature points, is the resulting transform with respect to a neutral face, with co-ordinates in a vector, by means of the sum where P is a matrix containing the auto-transforms as columns and v is a vector with ASM parameters.

The ASM model permits expression of the posture assumed by the face during motion tracking by means of a vector consisting of a few parameters. For the purpose of example, the co-ordinates of 41 markers can be approximated with satisfying results using 10 ASM parameters. Furthermore, these operations suppress a component of noise inherent to the acquisition system, i.e. which is not correlated to facial movement.

The low-level viseme calculation phase follows, after collecting voice and movement information.

The objective of this phase is to determine a vector of ASM parameters associated to each single phoneme, i.e. the viseme. The basic criterion is to create a synthesis (i.e. animation) which can best approximate the recorded movement. It is important to stress that this criterion is adopted in the invention to estimate the parameters used in the synthesis phase; this means that it is possible to reproduce the movement of any phrase, not only the phrases belonging to the set of phrases recorded during motion tracking. The animation, as mentioned, is guided by phonemes, which are associated to the respective temporal instants. A very discontinuous representation of movement corresponding to the instants of time associated to the phonemes would result if the visemes associated to the individual phonemes of an animation driving test were used directly. In practice, the movement of the face is a continuous phenomenon and, consequently, contiguous visemes must be interpolated to provide a continuous (and consequently more natural) representation of motion.

Interpolation is a convex combination of low-level visemes to be computed in which the coefficients of the combination (weights) are defined according to time. Note that a linear combination is defined convex when all coefficients are in the [0, 1] interval and their sum is equal to 1. The interpolation coefficients generally have a value other than zero only in a small interval surrounding the instant of utterance, where the coefficient value reaches the maximum. In the case in which passing interpolation for low-level visemes (forming the interpolation nodes) is required, all coefficients must be equal to zero in the temporal instant of a certain phoneme, except for that of the specific low-level viseme which must be equal to one.

An example of a function which can be used for the coefficients follows:

$$\beta_n(t) = \begin{cases} \cos^2\left(\frac{\pi}{2}\frac{t-t_n}{t_{n+1}-t_n}\right); & t \in [t_n, t_{n+1}] \\ \cos^2\left(\frac{\pi}{2}\frac{t-t_n}{t_n-t_{n-1}}\right); & t \in [t_{n-1}, t_n] \\ 0; & t \notin [t_{n-1}, t_{n+1}] \end{cases}$$

where $t_n$ is the instant of utterance of the nth phoneme.

The operations described hereinafter are used to respect the approximation criterion of the recorded movement with the synthesised movement. The low-level viseme vectors can be grouped in rows forming a matrix V. The coefficients of the convex combination can be in turn grouped in a row vector. The convex combination of visemes is consequently formed by the product. The vector of the coefficients is a function of time and a matrix C can be formed in which each row contains the coefficients of an instant in time. For the analysis, the instants for which motion tracking data exists are selected. The product CV contains rows of ASM vectors which can approximate the natural movement contained in tracking data. The purpose of this step is to determine the elements in the V matrix containing the low-level visemes, so as to minimise the gap between natural movement (that of the observed frames) and the synthesised movement.

Advantageously, the mean square distance between the rows of the product CV and the ASM vectors, representing the recorded movement, is minimised, as defined by the Euclidean rule.

After computing the low-level visemes, the following step consists in passing from the compressed representation, obtained by means of the operations described above, to a position in space of the feature points defined in the MPEG-4 standard. Considering that the computed low-level visemes are vectors containing ASM coefficients, conversion can be obtained by means of a simple matrix product, as described in the active shape model theory. A vector containing the feature point transform is obtained by multiplying the auto-transform matrix for the ASM vector (as a column).

In turn, the facial animation parameters on a lower level express the position of feature points related to an inexpressive face. Consequently, the translation of visemes, represented as positions of feature points on these low-level parameters, is immediate.

After performing the operations described above on all the phrases of the training set, the table linking the low-level facial animation parameters to the phonemes, which will then be used in the synthesis (or animation) phase, is made.

Figure 5:
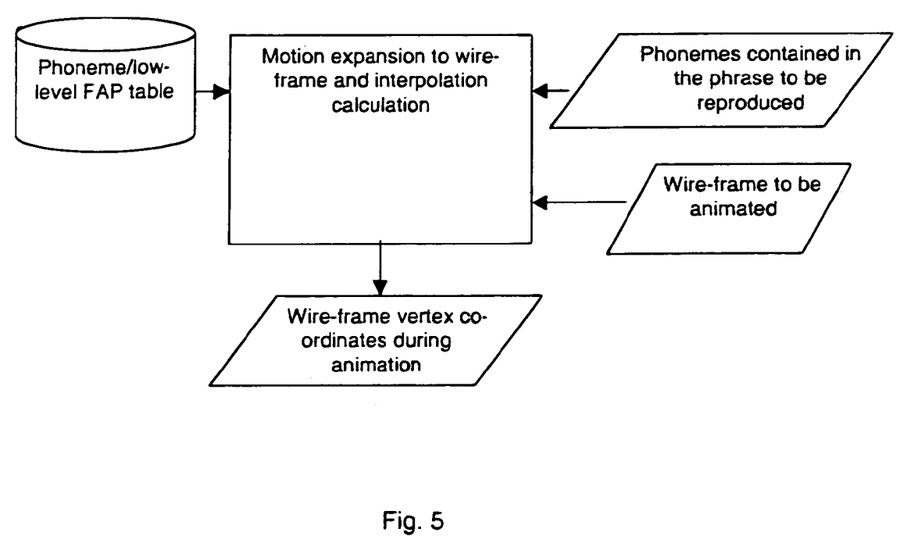
FIG. 5 is a flow chart illustrating the synthesis operations that convert the phonetic flow of a text used for driving the true facial model animation.

Reference is hereto made to the chart in FIG. 5, illustrating the operations related to synthesis or animation of the model starting from a given driving text.

"Synthesis" herein means computing movements for a wire-frame on the basis of phonetic and temporal information, so that the transforms are synchronised with associated sounds and closely reproduce lip movement. Synthesis is, consequently, the process which converts a sequence of visemes into a sequence of wire-frame co-ordinates, representing the face to be animated. Synthesis is based on the correspondence table between phonemes and low-level MPEG-4 FAPs, resulting from the analysis process. Consequently, the animation process takes the wire-frame to be animated, the phonemes contained in the phrase to be reproduced and the low-level mi/FAPs table as inputs. The wire-frame is specified by a set of points in space, by a set of polygons which exploit the previous points as vertices and by information inherent to the appearance of the surface, such as colour and texture.

To reproduce a given driving signal (generally, a phrase), firstly the phrase must be transcribed as a sequence of phonemes, each of which is labelled by the instant in time in which it was uttered, as shown in the example in Table 1. A discreet sequence of low-level visemes corresponds to this discreet sequence. The sequence of phonemes can be obtained in different ways, according to the source of the phrase to be reproduced. In the case of synthesised sound, in addition to generating the wave shape of speech, the synthesiser will generate the phonetic transcription and respective time reference. In the case of natural voice, this information must be extracted from the audio signal. Typically, this operation can be carried out in two different ways, according to whether the phonemes contained in the uttered phrase are known or not. The first case is called "phonetic alignment" and the second case is called "phonetic recognition", which generally provides lower quality results. These proceedings are all known in literature and are not the subject of this invention.

To ensure the naturalness and fluidity of movement of the animated face, a high number of pictures or frames per second (e.g. at least 16 frames) is required. This number is considerably higher than the number of phonemes contained in the driving signal. Consequently, numerous intermediate movements of the face contained between two subsequent phonemes will need to be determined, as shown in better detail below.

With reference to the creation of a single frame, it is stressed that facial animation parameters are taken from feature points. For this reason, which vertices in the wire-frame correspond to the considered feature points must be known. This information is obtained by means of a method which is similar to that used in the analytic phase, i.e. by multiplying the coefficient vector related to the primary components by the primary component matrix. In this way, the FAPs are transformed into movements of the vertices. Considering that the MPEG-4 standard specifies that the wire-frame should have a predefined spatial orientation, the FAP transformation into movements is immediate, considering that the FAPs are specified in units of measure related to the dimension of the face.

The model reproducing the face comprises, in general, a number of vertices which is much higher than the number of feature points. The movement of feature points must be extrapolated to obtain a defined movement of all vertices. The motion of each vertex not associated to a feature point will be a convex combination of the movements of feature points. The relative coefficients are calculated on the basis of the distance between the vertex to be moved and each of the feature points, and for this purpose the minimum length of distance along the arches of the wire-frame, known as Dijkstra's distance, is used (E. Dijkstra, "A note on two problems in connection with graphs", *Numerische Mathematik*, vol. 1, p. 269–271, Springer Verlag, Berlin, 1959). The contribution provided by a feature point to a vertex is inversely proportional to Dijkstra's distance between two points, to the nth power. This power is determined with the objective of providing greater importance to feature points close to the vertex to be moved and is independent from the dimension of the wire-frame.

The latter operation results in a representation of the low-level viseme on the entire wire-frame. The use of the method described above presents the advantage that all feature points act on all vertices, and therefore the specification of a sub-set of such points for each vertex to be moved is no longer required. This permits elimination of a work phase which otherwise must be carried out manually and is, consequently, extremely expensive, considering the high number of vertices in wire-frames also in the case of relatively simple models.

Figure 6:
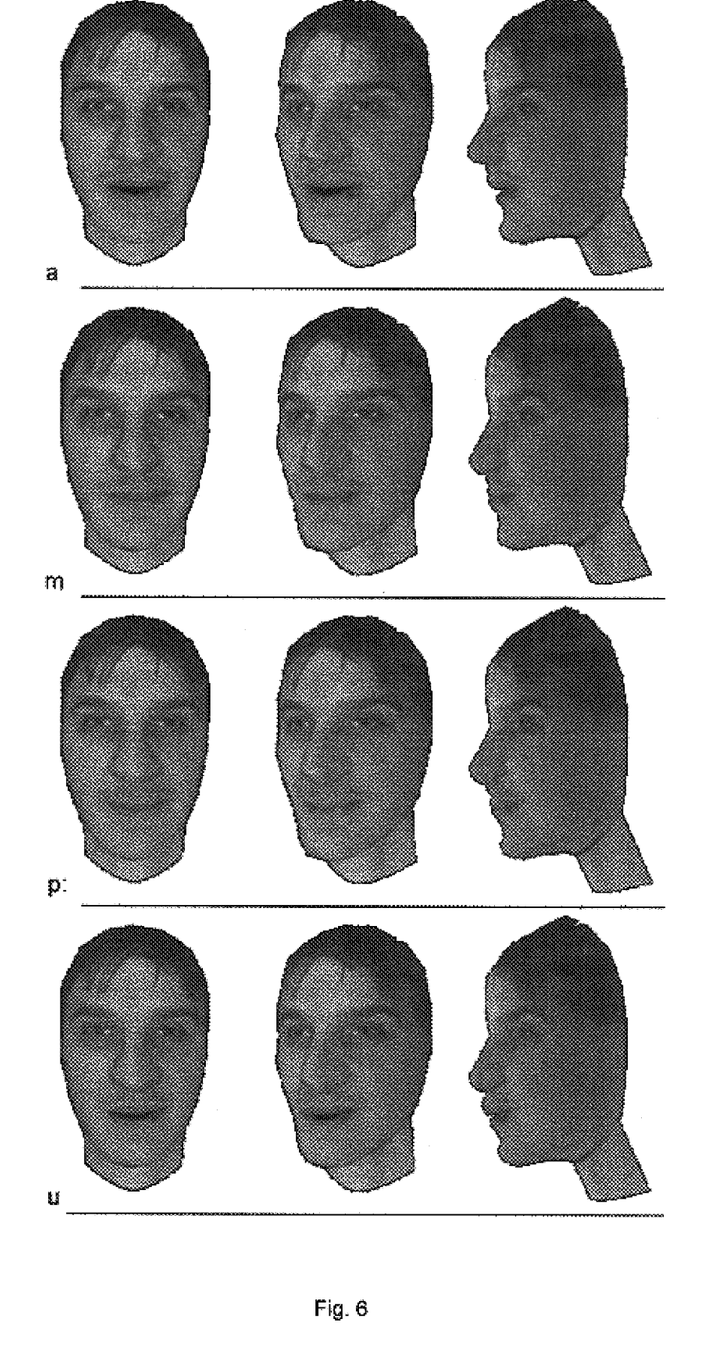
FIG. 6 illustrates an example of model animation.

FIG. 6 shows how the visemes corresponding to the phonemes a, m, p:, u (EURO-MPPA phonetic symbols) in the Italian language are expressed by altering the structure of an entire textured wire-frame.

As previously mentioned, temporal evolution must be considered for synthesising a phrase. The starting point is the sequence of known low-level visemes in discreet instants. In order to use a frequency of frames, variable or not, at will, the movement of the model is represented as a continuous function in time. The representation as a continuous function in time is obtained by the interpolation of low-level visemes, achieved in a similar fashion as described in the analytic phase.

A scaling acting as a coefficient in a convex combination is associated to each low-level viseme; this coefficient is a continuous function of time and is computed accordingly to the interpolation routine previously used in the analytic phase for computing the low-level visemes. For reasons of efficiency, the computation is preferably carried out by interpolation and the number of feature points is lower than the number of vertices. The continuous representation can be sampled at will to obtain the individual frames which shown in sequence and synchronised with sound, reproduce an animation on a computer.

The description herein is provided as a non-limiting example and obviously variations and changes are possible within the scope of protection of this invention.

The invention claimed is:

1. A method of animating a synthesized model of a human face driven by an audio driving signal, comprising an analytic phase, in which
an alphabet of low level visemes is determined, and
a synthesis phase, in which
the audio driving signal is converted into a sequence of low level visemes applied to a model, wherein said analytic phase comprises the steps of
extracting both a set of information representing a shape of a speaker's face and corresponding sequences of phonetic units from a set of audio training signals;
compressing said set of information into active shape model parameter vectors representative of phonetic units;
associating to said active shape model parameter vectors representative of phonetic units an interpolation function to provide a continuous representation of movement between phonemes, wherein said interpolation function is a convex combination having combination coefficients variable as a continuous function of time whereby said association determines said alphabet of low level visemes;
associating low level parameters of facial animation, compliant with Standard ISO/IEC 14496 VER. 1, to said low level visemes;
wherein said synthesis phase comprises the steps of
extracting a sequence of phonetic units of an audio driving signal;
associating to said sequence of phonetic units extracted in said synthesis phase a corresponding sequence of low level visemes as determined in the analytic phase;
transforming said sequence of low level visemes of said synthesis phase through an interpolation function to provide a continuous representation of movement between phonemes, wherein said interpolation function of said synthesis phase is a convex combination having combination coefficients variable as a continuous function of time; and
wherein the combination coefficients carried out in the synthesis phase are the same as those used in the analytic phase.

2. The method according to claim 1, wherein the combination coefficients $B_n(t)$ of said convex combinations are functions of the following type:

$$\beta_n(t) = \begin{cases} \cos^2\left(\frac{\pi}{2}\frac{t-t_n}{t_{n+1}-t_n}\right); & t \in [t_n, t_{n+1}] \\ \cos^2\left(\frac{\pi}{2}\frac{t-t_n}{t_n-t_{n-1}}\right); & t \in [t_{n-1}, t_n] \\ 0; & t \notin [t_{n-1}, t_{n+1}] \end{cases}$$

where $t_n$ is the instant of utterance of the nth phonetic units.

3. The method according to claim 2 wherein the wire-frame vertices, corresponding to model feature points, on the basis of which facial animation parameters are determined in the analytic phase, are identified and said low-level viseme interpolation operations are conducted by applying transforms on feature points for each low-level viseme, for animating a wire-frame based model.

4. The method according to claim 3 wherein for each position to be assumed by the model in said synthesis phase, the transforms are applied only to the vertices of the wire-frame corresponding to the feature points and the transforms are extended to remaining vertices by means of a convex combination of the transforms applied to the vertices of the wire-frame corresponding to the feature points.

5. The method according to claim 1 wherein said low-level visemes are converted into co-ordinates of the feature points of the face of the speaker, followed by conversion of said co-ordinates into low-level facial animation parameters compliant with Standard ISO/IEC 14496 VER.1.

6. The method according to claim 5 wherein said low-level facial animation parameters, representing the co-ordinates of feature points, are obtained in the analytic phase by analyzing movements of a set of markers which identify the feature points.

7. The method according to claim 6 wherein data representing the co-ordinates of the feature points of the face are normalized according to the following method:
a sub-set of markers are associated to a stiff object applied to the forehead of the speaker;
the face of the speaker is set, at the beginning of the recording, to assume a position corresponding as far as possible to the position of a neutral face model, as defined in standard ISO/IEC 14496 VER. 1, and a first frame of the face in such neutral position is obtained; and
for all frames subsequent to the first frame, the sets of co-ordinates are rotated and translated so that the co-ordinates corresponding to the markers of said sub-set coincide with the co-ordinates of the markers of the same sub-set in the first frame.

8. A method of generating an alphabet of low level visemes for animating a synthesized model of a human face driven by an audio signal, comprising the steps of
extracting both a set of information representing the shape of a speaker's face and corresponding sequences of phonetic units from a set of audio training signals;
compressing said set of information into active shape model (ASM) parameter vectors; and
associating to said active shape model (ASM) parameter vectors representative of phonetic units an interpolation function to provide a continuous representation of movement between phonemes, wherein said interpolation function is a convex combination having combination coefficients variable as a continuous function of time whereby said association determines said alphabet of low level visemes.

9. The method according to claim 8 wherein the combination coefficients $B_n(t)$ of said convex combinations are functions of the following type:

$$\beta_n(t) = \begin{cases} \cos^2\left(\frac{\pi}{2}\frac{t-t_n}{t_{n+1}-t_n}\right); & t \in [t_n, t_{n+1}] \\ \cos^2\left(\frac{\pi}{2}\frac{t-t_n}{t_n-t_{n-1}}\right); & t \in [t_{n-1}, t_n] \\ 0; & t \notin [t_{n-1}, t_{n+1}] \end{cases}$$

where $t_n$ is the instant of utterance of the nth phonetic units.

* * * * *